United States Patent [19]
Serfaty et al.

[11] Patent Number: 5,572,546
[45] Date of Patent: Nov. 5, 1996

[54] DATA COMMUNICATIONS SYSTEM WITH MULTILINK PROTOCOL

[75] Inventors: Salomon Serfaty, Doar Gaash; Haim Geller, Modi'in; Liorah Abel, Hertselia, all of Israel

[73] Assignee: Motorola, Inc., Schaumburg, Ill.

[21] Appl. No.: 362,359

[22] Filed: Dec. 22, 1994

[51] Int. Cl.[6] ................ H04B 1/38; H04L 5/16
[52] U.S. Cl. ............. 375/221; 370/95.1; 455/54.2
[58] Field of Search .................. 370/94, 112, 60, 370/18, 53, 95.1; 340/825.5; 375/219, 220, 221; 455/54.2

[56] References Cited

U.S. PATENT DOCUMENTS

| | | | |
|---|---|---|---|
| 4,623,886 | 11/1986 | Livingston | 340/825.5 |
| 5,319,641 | 6/1994 | Fridrich et al. | 370/85.3 |
| 5,359,320 | 10/1994 | Jaffe et al. | 340/825.5 |
| 5,371,734 | 12/1994 | Fischer | 370/18 |
| 5,386,412 | 1/1995 | Park et al. | 370/53 |

*Primary Examiner*—Stephen Chin
*Assistant Examiner*—Don Vo
*Attorney, Agent, or Firm*—James A. Coffing

[57] ABSTRACT

A data communications system comprising first (B), second (C) and third (A) remote units arranged for communication over a common communications channel. A first message to be sent to the second unit (C) is generated at the first unit (B). The first unit (B) waits for the channel to become available for independent transmission of the message. If ($t_0$), before the channel becomes available for independent transmission, a new message is received from the third unit (A) requiring an acknowledgement, the new message is received from the third unit (A), an acknowledgement of receipt of the message is transmitted ($t_1$) and in a substantially continuous transmission ($t_2$), the first message to the second unit is transmitted in a "piggy-back" manner. In a preferred arrangement, multiple messages can be piggy-backed to different units. Priorities can be assigned to these messages for acknowledgements.

6 Claims, 2 Drawing Sheets

5,572,546

DATA COMMUNICATIONS SYSTEM WITH MULTILINK PROTOCOL

FIELD OF THE INVENTION

This invention relates to a data communication system and method of operation thereof, having a number of communication units communicating data over a common communications channel. The invention relates to different communications media, including radio frequency channels, coaxial cables and multidrop modems.

BACKGROUND TO THE INVENTION

In data communication system where all the intervening units share a single multiple access channel, an arbitration method is normally devised in order to prevent collisions between units intending to use the channel at the same time. There are several methods described in the literature such as Carrier Sense Multiple Access (CSMA), Slotted CSMA, CSMA with collision detect (CSMA-CD), Digital Sense Multiple Access (DSMA), etc.

In these procedures, if a unit wishes to transmit, there is some checking that has to be performed first. In a pure CSMA case, for example, any unit, prior to transmission monitors whether the channel is free by sensing the carrier. If a transmission is currently occupying the channel, the unit will refrain from transmitting. Once the channel is sensed free, the unit transmits its data packet.

The OSI model of communications postulates that the responsibility of the link layer is reliably to deliver data packets from unit A to unit B on the same physical medium. This is normally achieved by appending an error detection code such as a cyclic redundancy check (CRC) computed on the data packet at the end of the pure data information. The receiving unit recomputes the CRC based on the received pure data. If this matches the original CRC in the data packet, the receiving unit declares the receiving packet as correct and passes it to the layer above, normally the network layer. At the same time, the receiving unit is responsible for sending to the originating unit a positive acknowledge packet (ACK) specifying that the packet has been correctly received. If the computed CRC however does not match the original one, the receiving unit may send a negative acknowledge (NAK) to the originating unit. The originating unit will resend the data packet again using the same mechanism until a positive ACK is received. Sometimes, it is preferred not to send NAKs, in which case the originating unity retries the data packet after a certain time-out has expired.

In the case where no NAKs are used, it is important that the receiving unit sends its ACK as soon as possible so that the above mentioned timer does not prematurely expire and an unneeded retry is performed.

For this reason, CSMA schemes are modified to take this fact into account. A unit wishing to transmit that senses that the channel is busy will wait until the channel is free. Once the channel is sensed free, it will not transmit immediately but wait for a certain period of time, normally a random period uniformly distributed between some lower limit T1 and some upper limit T2, and recheck once again if the channel is free. If at that time the channel is free, it will transmit. This is known as a Channel Access Procedure. This random wait time is needed to minimise the probability of collisions. If more than one unit wishes to transmit while the channel is sensed busy and no random wait provision is made, they will probably collide.

The unit that received the data packet and needs to send an ACK will send it immediately after sensing that the channel is free. Since the unit that had data to send refrained from transmitting once the channel was free, this will ensure that the ACK transmission will not be disturbed by other units.

It is a problem that each access to the channel takes a finite time which depends on such factors as channel resolution time (including carrier sense resolution time), propagation delays and wait times. These factors mean that there is inefficient overall use of the channel when there are large numbers of short messages and short acknowledgements.

There is a need for an improved method of operation of a communications system, with an improved multilink layer protocol.

SUMMARY OF THE INVENTION

According to the present invention, there is provided a method of operation of a data communication system comprising first, second and third remote radio units arranged for communication over a common radio channel. The method comprises the steps of: generating after the first unit a first message to be sent to the second unit and waiting for the channel to become available for independent transmission of the first message; if, before the channel becomes available for independent transmission, a new message is received from the third unit requiring an acknowledgement, receiving the new message from the third unit, transmitting an acknowledgement of receipt of the message and in a substantially continuous transmission, transmitting the first message to the second unit, otherwise if the channel becomes available for independent transmission before any new message is received requiring acknowledgement, transmitting the message to the second unit.

In this manner, the first message, which is independent of the message received from the third unit, can be transmitted at the earliest convenient opportunity, being piggy-backed to the acknowledgement to the third unit in the event that an acknowledgement of the third unit is required before the channel becomes available for the first unit to independently transmit the message.

In another aspect of the invention, a method of operation of a data communication system (for example a data radio communication system) is provided comprising a plurality of communication units arranged for communication over a common communications channel (for example a radio channels), the method comprising the steps of: transmitting from the first unit a message including an address of a destination unit and a priority parameter, receiving the message at the destination unit, transmitting an acknowledgement to the first unit and transmitting, in sequence with the acknowledgement, a selected number of messages to a selected number of other units, where the number of other units is selected according to the priority parameter.

The method is particularly advantageous because, in cases where low priority units wait longer periods of time before accessing the channel and higher priority units wait shorter periods of time, a unit "knows" that when it accesses the channel it is the highest priority unit contending for access and can therefore take advantage of its position as the highest priority unit to initiate further communications by sending the selected number of messages to the selected number of other units.

In cases where a unit receiving a message with a priority parameter waits a period dependent on the received priority parameter after the channel becomes free before transmitting, it is preferred that the unit waits a longer period when a low priority parameter is received and a shorter period when a high priority parameter is received and the preferred feature is provided of transmitting to a larger number of other units when a low priority parameter is received and a smaller number of other units when a high priority parameter is received.

In this manner, advantage can be taken of the absence of different levels of higher priority units on the channel and these levels can temporarily be utilised or assigned to selected numbers of other units, more units when there are more levels available and fewer units when there are fewer levels available. It is particularly preferred that the unit transmitting to this selected number of other units transmits to each of those other units a different priority parameter. Each priority parameter transmitted preferably represents a priority no lower than the priority of the previously received priority parameter.

Other aspects of the invention are defined in the claims.

A preferred embodiment of the invention is now described, by way of example only, with reference to the drawings.

DETAILED DESCRIPTION OF THE DRAWINGS

Figure 1:
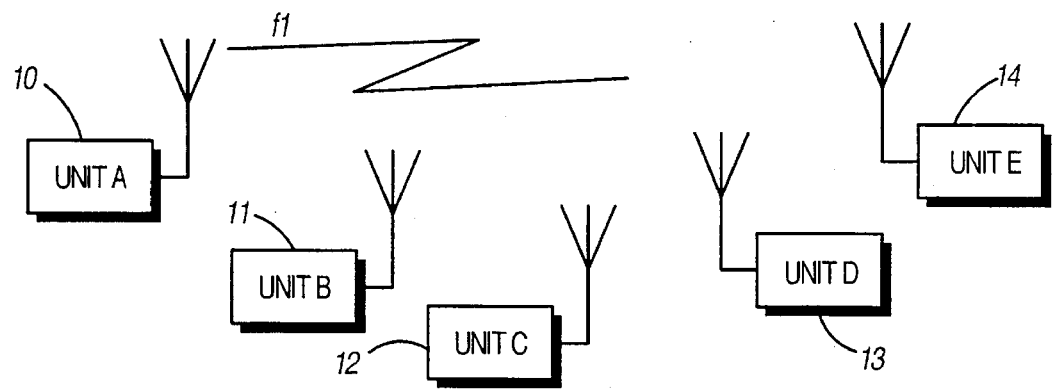
FIG. 1 shows a generalised typical multiple access system.

Referring to FIG. 1, a generalised communication system is shown. In this system, by way of example, all the units share the same radio frequency (RF) medium and all transmit and receive are the same frequency f1. All units are able to listen to any transmitting unit and determine whether the channel is being used (channel busy) or not (channel free).

Although the example refers to an RF medium, it can be applied to any multiple access system such as coaxial cables, multidrop modems under RS-485, etc.

The system comprises units 10, 11, 12, 13 and 14, which will be referred to as unit A to unit E respectively.

Figure 2:
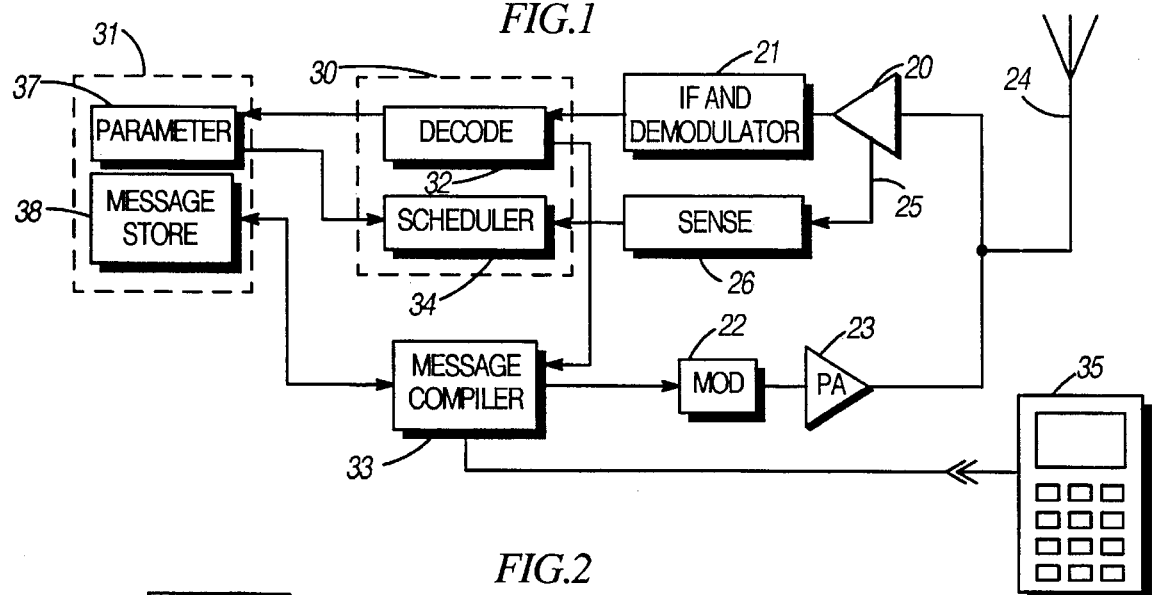
FIG. 2 shows details of one of the communication units of FIG. 1 in accordance with the preferred embodiment of the invention.

Details of one of the units of FIG. 1 is shown in FIG. 2. The unit comprises a receiver comprising a receive amplifier 20 and an intermediate frequency (IF) stage and demodulator 21 and it comprises a transmitter in the form of a modulation stage 22 and a power amplifier 23. The receiver amplifier 20 and the transmitter amplifier 23 are connected to an antenna 24. The receiver amplifier 20 has a received signal strength indicator 25 connected to channel sense circuitry 26.

A microprocessor 30 with memory 31 is provided. The microprocessor 30 has decode functions 32, message compiling functions 33 and scheduler functions 34. Connected to the microprocessor 30 is shown a data entry device 35.

In operation, signals are received through the antenna 24, amplified in the amplifier 20 and down-converted and demodulated in circuitry 21 to provide incoming data to the decode functions 32 of the microprocessor 30. The decode functions 32 extract address information from the received signals to determine whether the received signals are directed to the unit in question. The decode functions 32 also extract a priority parameter from the received signals. If a message is received intended for the unit in question, the priority parameter is stored in storage 37.

Receiver amplifier 20 provides a receive signal strength indicator signal 25 to carrier sense detector circuitry 26, which provides an interrupt or other signal to the scheduler functions of the microprocessor 30. This signal is provided when the sense circuitry 26 senses the start and end of a received incoming message.

For transmission of messages, data can be entered through data entry device 35 and such data is compiled into a message by message compiler 33 and compiled messages are stored in a message store 38 ready for transmission. The scheduler function 34 determines the time of transmission of the message stored in message store 38. Depending on the carrier sense circuitry 26 sensing that the channel is free and depending on the priority parameter 37, a timer can be set within scheduler 34 to time the transmission of a message after a wait period following sensing of free channel. If the timer times out, the message compiler 33 sends the message to the modulator circuitry 22, where it is modulated, amplified in amplifier 23 and transmitted through antenna 24.

Acknowledgements can be generated by message compiler 33 directly upon receipt of a message decoded by decoder function 32. The scheduler function 34 determines the timing of transmission of an acknowledgement (ACK) dependent on the sensing of free channel by the sensor circuitry 26 and depending on the priority parameter received and stored in storage 37.

Figure 3:
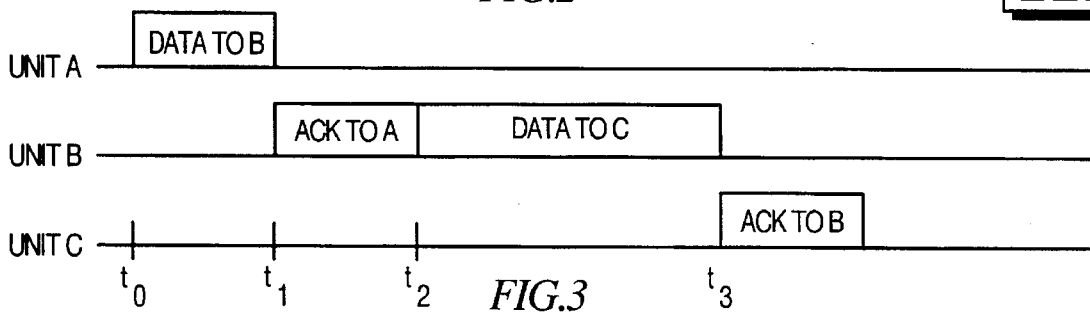
FIG. 3 is a time diagram showing operation of some of the units of FIG. 1 in accordance with the preferred embodiment of the invention.

Referring to FIG. 3, an example of operation is shown. At time $t_0$, unit A commences transmission of data to unit B. This message ends at time $t_1$ and unit B, through its sense circuitry 26, senses that the channel is free and sends an immediate acknowledgement to unit A. (The acknowledgement is shown as being virtually immediate, but there is inevitably some delay in sensing free channel and opening the transmitter.).

In a virtually continuous transmission with the acknowledgement to A, unit B sends a new message with data to unit C. This message is sent from time $t_2$ to time $t_3$. At time $t_3$ unit C sends an acknowledgement to unit B.

In this area shown in FIG. 3, it is not necessary that units A, B and C have different priority parameters, nor that the message from unit A to unit B contains any priority parameter, nor indeed the message from unit B to unit C.

Suppose a unit, say D, wishes to transmit while A is transmitting. It will check the channel and find that someone is transmitting. Once A finishes its transmission, unit D will wait for a certain period of time and recheck the channel status. Immediately following A's transmission, B will seize the channel for its ACK and, during that same transmission, send a data packet to C. If D is still willing to transmit, the channel will be sensed busy. After B sends its data to C, C will send its ACK immediately. It can be observed that using the above scheme, data transmissions may be piggy-backed to ACKs with no collisions. In the above case, C could have, if needed, sent a new data to another unit E, still with no fear of collision.

With this scheme, it can be observed that a unit, say A in the above example, cannot send data to more than one unit.

If it has so, say it sends data packets to units B and C, the ACKs of units B and C will collide since they will be transmitted at the same time. Then, if a unit has to send data packets to several units, it will have to perform several channel accesses, which, if the channel is being heavily used, may cause severe delays.

Figure 4:
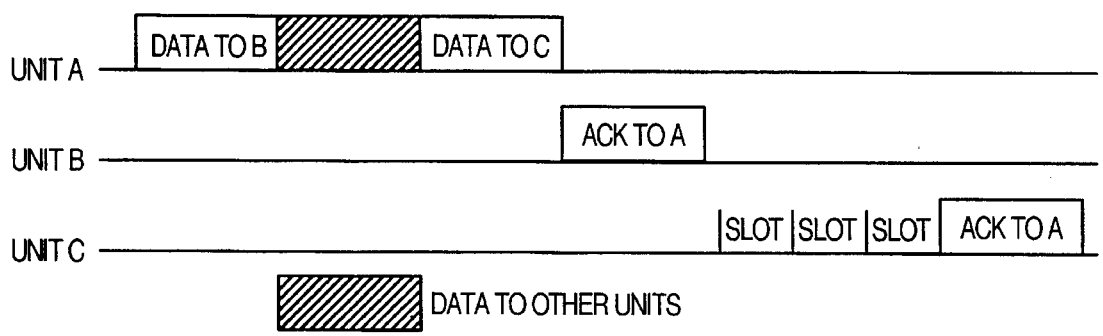
FIG. 4 is a second time diagram showing operation of some of the units of FIG. 1 with the transmission to multiple units.

This disadvantageous situation is resolved in the following arrangement described with reference to FIG. 4.

A unit willing to transmit to up to N different units attributes a priority for ACK, from 0 to N−1, to each of the destination units. A unit receiving a packet whose priority is set to j, where j is between 0 and N−1, will wait for exactly j period of times called "time slots" to see that the channel is free and immediately send its ACK back. For example, if unit B is assigned priority 0, it will send its ACK immediately following the transmission from A. If unit C, for example, is given priority 3, it will wait for 3 free slots and then transmit.

Normally, a unit will transmit to N units and attribute them priorities of 0 to the first unit, 1 to the second one , . . . , N−1 to the Nth one, etc. A unit willing to transmit while this process is ongoing, will wait for N free slots and then will wait for an extra random time. As expressed before, this extra random time is needed to minimise the probability of collisions of units that had pending transmissions while the channel was in the above Data-ACK mode. The number N is a parameter that has to be set system-wide for all units and is defined as the maximum number of units that can be addressed in a single transmission. This parameter has to be known by all units so that they know how many free slots they have to wait during their channel access procedures.

The above arrangement provides for transmission from one end unit to multiple units. The following describes how data can be piggy-backed to ACKs from the multiple unit. Each unit operates to the following rules:

Rule 1: A unit that gets a data packet and is assigned priority j to send its ACK may piggy-back data packets to its ACK for up to j+1 units and assign them priorities from 0 to j for their ACKs.

Rule 2: A unit that has to send a packet not piggy-backed to a pending ACK will monitor the channel for N empty slots, wait an extra random time and recheck the channel. If the channel is free, it may proceed with its transmission.

Rule 3: A unit that gets from other units several different priorities, may choose any of the assigned priorities to transmit.

To clarify the meaning of the rules above, the following examples are given:

EXAMPLE 1

Assume that unit A transmits to unit B assigning it priority 0, by the above rule, unit B may piggy-back data to one unit. This is a special case of single link and is similar to the one depicted in FIG. 3.

EXAMPLE 2

Figure 5:
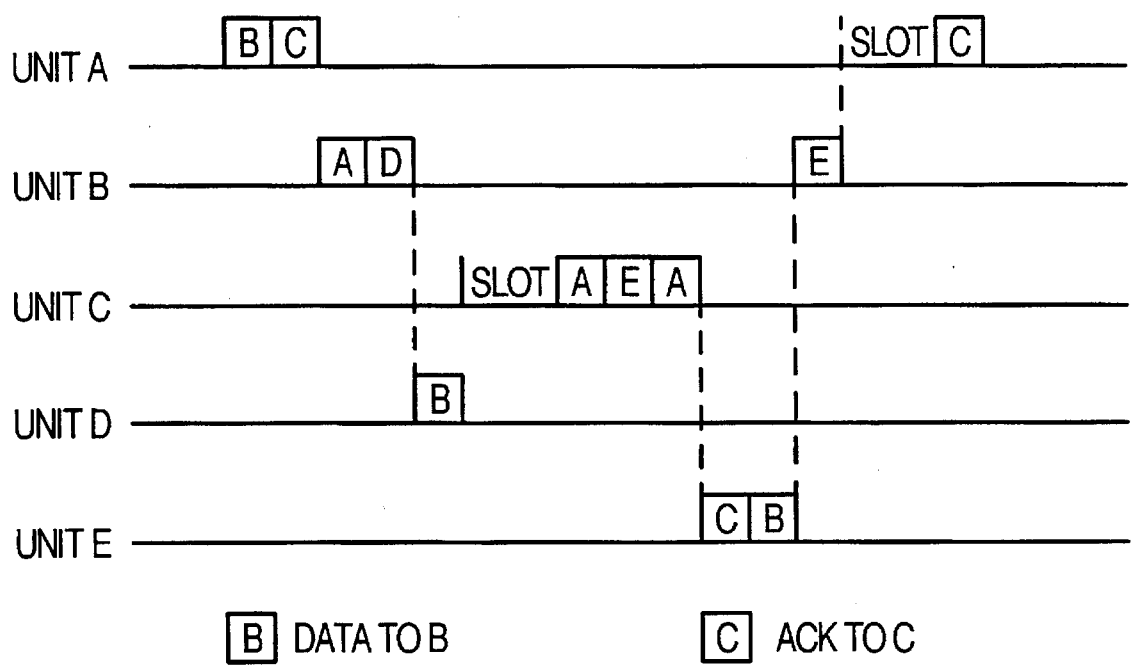
FIG. 5 is a further time diagram showing a more complex sequence of operations by the units of FIG. 1.

This example is shown in FIG. 5.

Unit A sends data to units B and C and assigns priority 0 to unit B and priority 1 to unit C. This means now that unit B may transmit to a single unit with its ACK while unit C may do so to two units. Unit B sends its ACK to A with priority 0 and data to unit D, attributing to unit D priority 0. Then unit D responds with an ACK with priority 0. Next, unit C that was assigned priority 1 senses that the channel has been free for one slot and transmits ACK to unit A and data to units E and A, assigning them priority 0 and 1 respectively. Unit E sends its ACK to C with priority 0 and data to B assigning to B priority 0 for ACK. B sends its ACK to A. Then unit A waits for a free slot and sends in its ACK.

Observe how unit C that gets priority 1 in its first reception from A may use its level of priority to send data to more units without having to go through the channel access procedure.

The justification of the above rules is as follows. Assume a unit is assigned priority j to send its ACK. Once there are j free slots, the unit knows that all the units that had a lower number in their assigned priority have completed their transactions with their ACKs. Therefore, this unit may reuse the priorities up to j. Concerning rule 2, it follows an access procedure where new data not piggy-backed to ACKs should wait for the completion of all ACKs in the system. Rule 3 is needed for completeness only. A unit that is assigned several priorities may choose among them.

In this manner, a system is provided which offers a way of transmitting to multiple units during the same transmission, ensuring that ACKs from the addressed units will not collide.

Additionally, the arrangement provides a way of piggy-backing data to ACKs, not necessarily to the unit to which the ACK is addressed. This manner of piggy-backing guarantees that all ACKs in the system will be free of collisions.

A major advantage is that of minimum delay in transferring data. This is achieved because, whilst transmitting an ACK, in cases where data is pending to the same or other units, the data can be transmitted without entering a time consuming channel access procedure.

Modifications of detail can be made. For example, although rule no. 2 above stipulates a random wait time after the ACK period is consumed (Their RN free slots) any channel access procedure of the CSMA type can be used such as pure CSMA, slotted CSMA etc.

We claim:

1. A method of operation of a data communications system comprising a plurality of communications units arranged for communication over a common communications channel, the method comprising the steps of:

transmitting from the first unit a message including an address of a destination unit and further including an acknowledgment priority parameter, receiving the message at the destination unit, transmitting an acknowledgment to the first unit and transmitting, in sequence with the acknowledgment, a selected number of messages to a selected number of other units, where the number of other units is selected according to the acknowledgment priority parameter, wherein the destination unit receiving the message with the acknowledgment priority parameter waits a period dependent on the received acknowledgment priority parameter after the channel becomes free before transmitting, waiting a longer period when a lower acknowledgment priority parameter is received and a shorter period when a high acknowledgment priority parameter is received.

2. A method of operation of a data communications system comprising a plurality of communications units arranged for communication over a common communications channel, the method comprising the steps of:

transmitting from the first unit a message including an address of a destination unit and further including an acknowledgment priority parameter, receiving the message at the destination unit, transmitting an acknowledgment to the first unit and transmitting, in sequence with the acknowledgment, a selected number of messages to a selected number of other units, where the number of other units is selected according to the acknowledgment priority parameter, wherein the destination unit receiving the message with the acknowledgment priority parameter.

waits a period dependent on the received acknowledgment priority parameter after the channel becomes free before transmitting, waiting a longer period when a lower acknowledgment priority parameter is received and a shorter period when a high acknowledgment priority parameter is received and transmits to a larger number of other units when a low acknowledgment priority parameter is received and a smaller number of other units when a high acknowledgment priority parameter is received.

3. The method according to claim 2, wherein the unit transmitting to the selected number of other units transmits to each of those other units a different acknowledgement priority parameter, each acknowledgement priority parameter transmitted representing an acknowledgement priority no lower than the acknowledgement priority of the previously received acknowledgement priority parameter.

4. The method according to claim 3, wherein the communications channel is a radio communications channel.

5. A data communications system comprising a plurality of communications units arranged for communication over a common communications channel, each unit comprising:

a receiver for receiving messages and acknowledgments from other units, the receiver having a channel monitor, a transmitter, a message compiler arranged to compile selectively messages and acknowledgments with addresses of units for which the messages and acknowledgments are intended, and arranged to compile a message to a first unit and store the message in preparation for transmission and a transmission scheduler arranged to schedule timing of transmissions on the channel in response to the channel monitor, where the transmission scheduler is arranged to schedule timing of transmission of an acknowledgment to a message received from a second unit independent of the message to be transmitted to the first unit and is arranged to schedule timing of transmission of the message to the first unit immediately following transmission of the acknowledgment to the second unit, wherein each message requiring an acknowledgment includes an acknowledgment priority parameter, and the timing of transmission of an acknowledgment to a message requiring an acknowledgment is scheduled based on the acknowledgment priority parameter contained in that message whereby a unit receiving a message with an acknowledgement priority parameter waits a period dependent on the received acknowledgment priority parameter after the channel becomes free before transmitting, waiting a longer period when a lower acknowledgment priority parameter is received and a shorter period when a high acknowledgment priority parameter is received.

6. The system according to claim 5, wherein the receiver is a radio receiver, the transmitter is a radio transmitter and the communications channel is a radio communications channel.

* * * * *